Patented Oct. 26, 1937

2,096,842

UNITED STATES PATENT OFFICE 2,096,842

TRIMETHINE CYANINE DYES

Johannes Brunken, Dessau in Anhalt, Adolf Sieglitz, Frankfort-on-the-Main-Sindlingen, and Martin Dabelow, Frankfort-on-the-Main-Hochst, Germany, assignors to Agfa Ansco Corporation, Binghamton, N. Y., a corporation of New York No Drawing. Application May 3, 1933, Serial No. 669,276. In Germany May 6, 1932

5 Claims. (Cl. 260—44)

Our present invention relates to sensitizing photographic emulsion.

One of its objects is to provide such an emulsion the sensitiveness of which is raised over the range of wave lengths to which the emulsion is normally sensitive. Another object are the dyes incorporated in the emulsion in order to increase their sensitivity. Further objects will be seen from the detailed specification following hereafter.

This invention is based on the discovery that polymethine dyestuffs which have been substituted in at least one of the benzene nuclei by thioalkyl-, thioaryl-, selenoalkyl- or selenoaryl-groups, are valuable sensitizing dyestuffs with a remarkable sensitizing power, the range of sensitivity when compared with that of non-substituted dyestuffs being considerably displaced towards the long-wave region. Such dyestuffs are, for instance, derived from the general formula

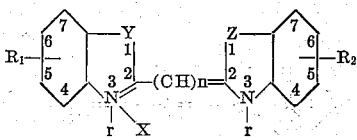

wherein Y and Z stand for O, S, Se, —CH=CH— and the group

(R' and R" stand for alkyl and aryl), r stands for alkyl, $R_1$ and $R_2$ stand for thioalkyl, thioaryl, selenoalkyl or selenoaryl, X stands for Cl, Br, I, $SO_4CH_3$, $ClO_4$ or another acid radical, n stands for an odd number.

The hydrogen of the central hydrocarbon atom of the polymethine chain may be substituted by alkyl, aralkyl or aryl. The side members of the polymethine chain may be substituted by alkyl radicals.

In the above formula there may be present in the benzene nuclei one or more of the radicals $R_1$ and $R_2$ or there may be present besides the radicals $R_1$ and $R_2$ another substituent.

The introduction of the thioalkyl and thioaryl-groups is effected according to known chemical methods. Thus, for instance, an amino group is diazotized and the xanthic acid ester obtained on reaction with a xanthate is split into thiophenol by means of alkali, whereupon the thiophenol thus obtained is etherified. The introduction of the selenoalkyl or selenoaryl groups is, for instance, effected by diazotizing an amino group, acting upon the diazotized amino group with seleno-potassium cyanide, splitting the seleno-cyan compound obtained into selenophenol by means of alkali and etherifying the selenophenol.

The substituted heterocyclic base obtained in this manner is condensed, according to known methods for production of the cyanine dyestuffs.

The dyes are obtainable according to the desired solubility in form of the bromide, iodide, perchlorate, etc., and are used in a quantity as usual for the known sensitizing dyes. This quantity amounts to about 10 to 30 milligrams per 1 kg. of emulsion ready for being cast which contains about 9 per cent of gelatine, 4.5 per cent of silver-halide, the rest being water. However, we do not wish to limit our invention to the quantities just indicated, the most suitable amount will in each case be found by a few comparative experiments. The dyes may be added to the emulsion in form of solutions. Suitable solvents are the alcohols, for instance, methyl or ethyl alcohol which may be used anhydrous or diluted with water. The dyes are applied to the emulsion during any stage of its production, however, they are preferably added to the finished emulsion before being cast.

The dyes may likewise be added by bathing the finished photographic material in a bath in which the dye is dissolved. Such a treatment may be as follows:—The photographic material to be sensitized is bathed in a solution containing 1 milligram of sensitizer in 50 cc. of an aqueous solution of methanol of 50 per cent strength for about 5 minutes. The material is then dried, whereupon it is ready for use.

The following examples serve to illustrate the invention.

*Example 1.*—For producing the dye bis-[3-ethyl-6-meththio-benzthiazole-(2)]-trimethine cyanine bromide corresponding with the formula

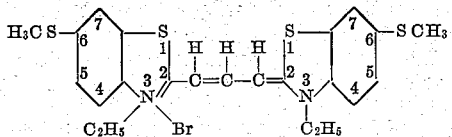

there is first prepared the base 2-methyl-6-meththio-benzthiazole as follows:

7.5 grams of 6-amino-2-methylbenzothiazole are dissolved in 10 cc. of concentrated hydrochloric acid and mixed with 10 grams of ice. The amino compound is diazotized in the usual manner by means of 3.6 grams of sodium nitrite dissolved in 6 cc. of water. This solution is added drop by drop to a solution of 12 grams of potassium xanthogenate in 15 cc. of water at 40 to 45° C. while stirring. The solution is shaken out with ether and the ether distilled after the solution has been dried.

10 grams of the raw ester of the xanthogenate are dissolved in 30 cc. of alcohol and boiled with 10 grams of potassium hydroxide for about 8 hours. The alcoholic solution of the thiophenol formed is shaken with dimethyl sulfate in a small excess at about 50° C. The 5-meththio-2-methylbenzothiazole is extracted with ether and the ether distilled off. The oily residue begins to crystallize after a short time.

The base 6-meththio-2-methylbenzothiazole is made into its quaternary ammonium salt by heating the base with diethyl-sulfate added in an excess of about 10 per cent. The 6-meththio-2-methylbenzothiazole diethylsulfate is purified by treatment with ether.

2 grams of 5-meththio-2-methylbenzothiazole diethylsulfate are boiled with 8 cc. of triethyl ortho-formic acid and 8 cc. of pyridine. The dye crystallizes from this mixture. It is dissolved in methanol and is made into the bromide by the addition of potassium bromide.

The alcoholic solution of the dye has an absorption maximum at a wave length of about 580 μμ.

Incorporated in a silver bromide gelatin emulsion containing about 4 per cent of silver iodide the dye imparts to it a range of sensitivity from about 520 μμ to 670 μμ with a maximum at about 610 μμ.

In analogous manner there may be produced dyes substituted in a different position or positions.

*Example 2.*—The dye bis[3-ethyl-6-methseleno-benzthiazole-(2)]-tri-methine-cyanine iodide corresponding with the formula

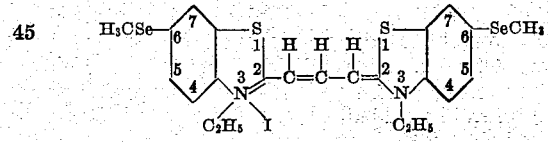

is obtained as follows:

30 grams of 6-amino-2-methyl-benzothiazole are diazotized in the well known manner. The diazo-solution is run into a mixture of 100 cc. of seleno-potassium cyanide (with a content of 15 per cent of Se) in 800 cc. of water. The mixture is heated to 60° C. and the selenocyan compound of the thiazole separates in form of yellow brown flakes which are recrystallized from alcohol.

5 grams of the selenocyan compound are dissolved in 25 cc. of alcohol and boiled for ½ hour after the addition of 50 cc. of a 2n solution of caustic soda and 5 grams of Na2S2O4. The solution is filtered from the undissolved parts and shaken in the warmth with 8 grams of dimethyl-sulfate. The mixture is shaken out with ether and the base removed by means of HCl. The acid solution is made alkaline and the base shaken out with ether. After evaporating the ether the base 6-methseleno-2-methyl-benzothiazole remains in form of an oily residue which soon begins to crystallize.

The production of the dye from the base is analogous to the method described in Example 1.

6-methseleno-2-methyl-benzothiazole is transformed into a quaternary salt by boiling the base for two days with a small excess of ethyl iodide.

2 grams of 6-methseleno-2-methyl-benzothiazole ethiodide are boiled with 8 cc. of pyridine and 2 cc. of triethylorthoformate for about half an hour. The dye crystallizes from the reaction mixture and is recrystallized from alcohol.

The alcoholic solution of the dye has an absorption maximum at a wave length of about 585 μμ.

Incorporated in a silver bromide gelatin emulsion containing about 4 per cent of silver iodide the dye imparts to it a range of sensitivity from about 520 μμ to 690 μμ with an indefinite maximum at about 610 μμ to 615 μμ.

*Example 3.*—The dye [3-ethyl-5-ethseleno-benzthiazol-(2)]-[3-ethyl-6-methyl-quino-(2)]-methine-cyanine iodide corresponding with the formula

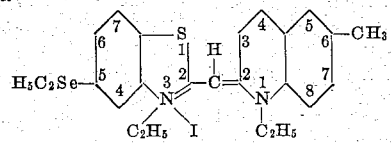

is obtained as follows: 2 grams of 5-ethseleno-2-methylbenzothiazole ethiodide and 2 grams of 2-iodo-6-methylquinoline ethiodide are dissolved in 25 cc. of alcohol in the warmth and this solution is boiled with 10 cc. of an alcoholic solution of sodium ethylate containing 2.5 per cent of sodium for a short time. The dye obtained may be recrystallized from alcohol.

The alcoholic solution of the dye has an absorption maximum at a wave length of about 495 μμ.

Incorporated in a silver bromide gelatin emulsion containing about 4 per cent of silver iodide the dye imparts to it a range of sensitivity from about 510 μμ to 600 μμ with a maximum at about 525 μμ.

*Example 4.*—The dye bis-[3-ethyl-6-methseleno-benzthiazole-(2)]-β-methyl-trimethine cyanine iodide corresponding with the formula

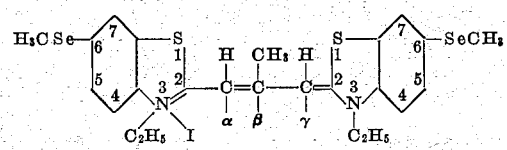

may be obtained by boiling 2 grams of 6-methseleno-2-methylbenzothiazole ethiodide, 8 cc. of pyridine and 2 cc. of triethyl ortho-acetate for ½ hour. The dye crystallizes on the addition of ether and may be recrystallized from ether.

The alcoholic solution of the dye has an absorption maximum at a wave length of about 565 μμ.

Incorporated in a silver bromide gelatin emulsion containing about 4 per cent of silver iodide the dye imparts to it a range of sensitivity from about 510 μμ to 680 μμ with a maximum at about 600 μμ.

*Example 5.*—The dye bis-[3-ethyl-6-methseleno-benzthiazole-(2)]-β-ethyl-trimethine cyanine iodide corresponding with the formula

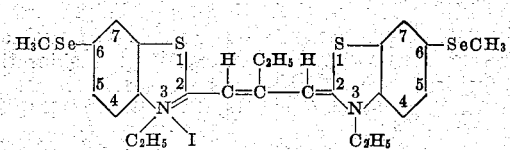

may be obtained when working as described in Example 1, but replacing the triethyl ortho-acetate by triethyl ortho-propionate.

The alcoholic solution of the dye has an absorption maximum at a wave length of about 570 μμ.

Incorporated in a silver bromide gelatin emulsion containing about 4 per cent of silver iodide the dye imparts to it a range of sensitivity from about 510 μμ to 680 μμ with a maximum at about 605 μμ.

Example 6.—The dye bis-[3-ethyl-5-methoxy-6-meththio-benzthiazol-(2)]-trimethine cyanine iodide corresponding with the formula

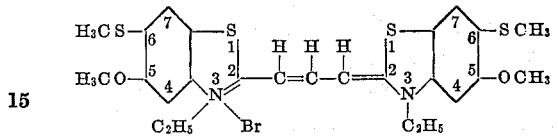

is obtained by heating 11.7 grams of 5-methoxy-6-meth-thio-2-methylbenzothiazole and 10 grams of p-toluene sulfonic acid ethylester for 3 hours to 140° C. After cooling there are added 15 grams of triethyl o-formate and 120 cc. of dry pyridine and the mixture is boiled for 2 hours under reflux. Then the pyridine is removed by distillation in the vacuum, the residue is dissolved in 250 cc. of alcohol and to this solution there is added a concentrated aqueous solution of 4.1 grams of potassium iodide. The dye which crystallizes is recrystallized from anhydrous alcohol.

The alcoholic solution of the dye has an absorption maximum at a wave length of about 610 μμ.

Incorporated in a gelatin silver bromide emulsion containing about 4 per cent of silver iodide, the dye imparts to it a range of sensitivity from about 510 μμ to 720 μμ with a maximum at about 640 μμ which is very flat.

It is to be understood that our invention is not limited to the foregoing examples or to the specific details given therein. Numerous other embodiments are possible and we contemplate as included within our invention all such modifications and equivalents as fall within the scope of the appended claims. So, for instance, the benzene nuclei may contain one or more substituents. The nomenclature used is arbitrary, but it is familiar to every chemist skilled in the art and has the advantage of clearness.

What we claim is:

1. The dye bis-[3-ethyl-6-meththio-benzthiazole-(2)]-trimethine-cyanine having in its alcoholic solution an absorption maximum at about 580 μμ.

2. The dye bis-[3-ethyl-6-methseleno-benzthiazole-(2)]-β-ethyl-trimethine-cyanine having in its alcoholic solution an absorption maximum at about 560 μμ.

3. The dye bis-[3-ethyl-5-methoxy-6-meththio-benzthiazole-(2)]-trimethine-cyanine having in its alcoholic solution an absorption maximum at about 610 μμ.

4. A bis-[3-alkyl-benzthiazole-(2)]-trimethine cyanine salt containing in the benzene nuclei fused on to the heterocylic nuclei a substituent selected from the group consisting of thioalkyl and selenoalkyl.

5. A bis-[3-alkyl-benzthiazole-(2)]-β-alkyl-trimethinecyanine salt containing in the benzene nuclei fused on to the heterocyclic nuclei a substituent selected from the group consisting of thioalkyl and selenoalkyl.

JOHANNES BRUNKEN.
ADOLF SIEGLITZ.
MARTIN DABELOW.